(12) United States Patent
King et al.

(10) Patent No.: US 7,669,398 B1
(45) Date of Patent: Mar. 2, 2010

(54) HARVESTING MACHINE

(75) Inventors: Thomas P. King, Punta Gorda, FL (US);
Bobby Ray Ricks, Punta Gorda, FL (US)

(73) Assignee: Supertrak, Inc., Punta Gorda, FL (US)

( * ) Notice: Subject to any disclaimer, the term of this patent is extended or adjusted under 35 U.S.C. 154(b) by 1231 days.

(21) Appl. No.: 11/149,994

(22) Filed: Jun. 10, 2005

Related U.S. Application Data

(63) Continuation-in-part of application No. 10/615,216, filed on Jul. 8, 2003, now abandoned.

(60) Provisional application No. 60/394,454, filed on Jul. 8, 2002.

(51) Int. Cl.
*A01D 46/20* (2006.01)

(52) U.S. Cl. .................. 56/328.1; 56/329; 182/2.11

(58) Field of Classification Search ............ 56/328.1, 56/329; 182/62.5, 2.11, 2.1–2.3, 2.8, 2.9
See application file for complete search history.

(56) References Cited

U.S. PATENT DOCUMENTS

| | | | | |
|---|---|---|---|---|
| 2,450,152 A | * | 9/1948 | Miller | 414/508 |
| 2,798,623 A | * | 7/1957 | Girardi | 414/508 |
| 2,821,312 A | * | 1/1958 | Wiegel | 414/508 |
| 2,927,705 A | * | 3/1960 | Girardi | 414/508 |
| 2,953,229 A | * | 9/1960 | Wiegel | 193/7 |
| 2,973,112 A | * | 2/1961 | Young | 414/508 |
| 3,227,296 A | * | 1/1966 | Marks | 414/508 |
| 3,255,845 A | * | 6/1966 | Gardner | 182/14 |
| 3,329,290 A | * | 7/1967 | Lowery | 414/508 |
| 3,347,587 A | * | 10/1967 | Frost | 294/87.1 |
| 3,568,796 A | * | 3/1971 | Stanhope | 182/141 |
| 3,593,867 A | * | 7/1971 | Moe | 414/728 |
| 3,633,336 A | * | 1/1972 | Rempel | 53/391 |
| 3,641,738 A | * | 2/1972 | Johnson | 53/391 |
| 3,667,190 A | * | 6/1972 | Thornton-Trump | 53/503 |
| 3,866,713 A | * | 2/1975 | Carpenter et al. | 182/2.1 |
| 3,878,957 A | * | 4/1975 | Rempel | 414/486 |
| 3,987,608 A | * | 10/1976 | Wilcox, Jr. | 56/328.1 |
| 4,074,819 A | * | 2/1978 | Labourre | 414/744.3 |
| 4,888,941 A | * | 12/1989 | Gerber | 56/328.1 |
| 5,007,772 A | * | 4/1991 | McKenna et al. | 406/39 |

(Continued)

*Primary Examiner*—Thomas B Will
*Assistant Examiner*—Joan D Misa
(74) *Attorney, Agent, or Firm*—William E. Noonan

(57) ABSTRACT

A machine is provided for harvesting produce such as fruit from a pair of adjacent, generally parallel rows of trees. The machine includes a land vehicle for being driven between the adjacent rows of trees. The land vehicle includes a chassis that supports a fruit collection receptacle. There are at least one pair of selectively extendible and retractable lift arms pivotably mounted to the chassis. Each arm in each pair supports proximate a distal end thereof a carrier for holding a person. Each arm is adjustable to position the carrier such that a person in the carrier is able to manually collect fruit form a respective one of the rows of trees. There are plurality conduits, each of which is attached proximate an upper end thereof to a respective one of the carriers such that an entrance of the conduit is accessible to a person in a respective carrier. Each conduit is attached proximate a lower end thereof to the receptacle such that fruit deposited into the entrance of the conduit by the person in the carrier is transmitted through the conduit and discharged into the receptacle.

20 Claims, 7 Drawing Sheets

U.S. PATENT DOCUMENTS

| | | | | |
|---|---|---|---|---|
| 5,082,085 A | * | 1/1992 | Ream et al. | 182/2.9 |
| 5,205,677 A | * | 4/1993 | McKenna | 406/39 |
| 5,547,207 A | * | 8/1996 | Madler | 280/104 |
| 5,996,722 A | * | 12/1999 | Price | 180/403 |
| 2005/0091957 A1 | * | 5/2005 | Stanners et al. | 56/328.1 |
| 2005/0279563 A1 | * | 12/2005 | Peterson | 180/414 |
| 2008/0251157 A1 | * | 10/2008 | Mason | 144/343 |

* cited by examiner

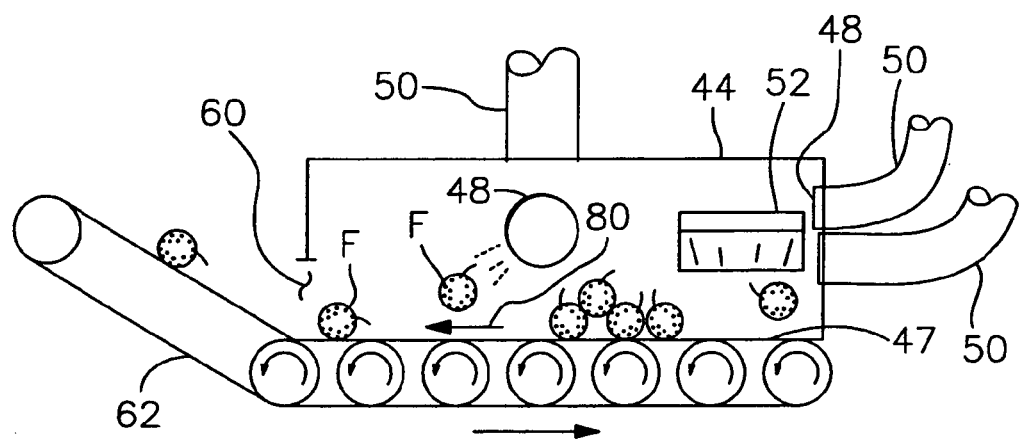
*Fig. 4*
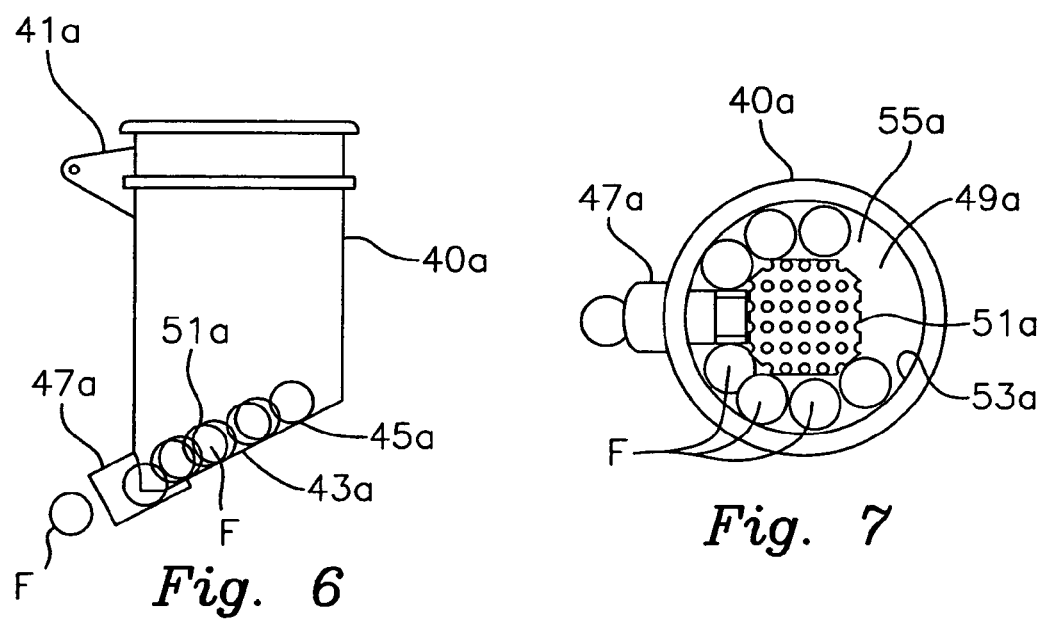
*Fig. 6*
*Fig. 7*

HARVESTING MACHINE

RELATED APPLICATION

This application is a continuation in part of U.S. patent application Ser. No. 10/615,216 filed Jul. 8, 2003 now abandoned, which claims the benefit of U.S. Provisional Application Ser. No. 60/394,454, filed Jul. 8, 2002.

FIELD OF THE INVENTION

This invention relates to a harvesting machine and, more particularly to a machine for facilitating the manual harvesting of citrus and other varieties of tree grown fruits and produce.

BACKGROUND OF THE INVENTION

Citrus and other types of fruit have traditionally been harvested manually. This type of work is quite labor intensive and therefore costly. Moreover, persons picking fruit and other varieties of tree grown produce by hand have been required to use unwieldy ladders to reach the higher levels of the tree. This has created a serious risk of falls and resulting injuries. As a result, worker's compensation costs in the fruit harvesting industry have increased dramatically. Manual harvesting also presents various problems associated with a transient and poorly educated work force. Recently, immigration and security issues have made the citrus industry's almost exclusive reliance upon such workers increasingly undesirable.

Various mechanized solutions have been proposed for the harvesting industry. For example, an assortment of shakers and canopy penetrators have been utilized to retrieve fruit mechanically. Each of these known devices exhibits certain problems, however. Such machines tend to be incredibly expensive. In many cases they are not suited for the particular grove or produce being harvested, or for the particular harvesting season. Known mechanical harvesters also tend to excessively damage the tree and create considerable debris. In many cases, a significant amount of fruit is missed during the mechanical harvesting process. Due to these difficulties, manual harvesting is still the preferred means of picking fruit.

"Cherry picker" machines have recently been used to improve manual harvesting. Typically, a single individual is raised and lowered in a bucket supported at the end of a mechanically operated boom or lift arm. The collected fruit is either dropped to the ground for later collection or deposited in a container carried on the bucket. Neither technique is optimally efficient. In the former case, additional workers must accompany the machine to collect fruit that is dropped on the ground. Once again, this technique is labor intensive, inefficient and costly. In addition, fruit can be damaged when it is dropped a considerable height to the ground. Depositing the picked fruit into a bin or container carried by the bucket is also quite inefficient. Each time the bin or basket is filled, the boom or lift arm must be lowered so that the fruit can be emptied into a larger container or hopper. In order to completely harvest the tree, the boom must be gradually raised and lowered so that the worker can collect produce from each level of the tree. The harvesting process is therefore quite time consuming, particularly when the machine must be maneuvered through many rows of fruit or other produce bearing trees in order to complete the harvesting process.

A number of harvesting machines are known, which use multiple booms or lift arms for allowing respective workers to pick fruits at varying heights. See, for example, Girardi, U.S. Pat. No. 2,927,705, Wiegel, U.S. Pat. No. 2,821,312 and Gerber, U.S. Pat. No. 4,888,941. All of the known harvesting machines exhibit various limitations that adversely effect their efficiency and productivity. In each case, a worker must carefully place the fruit in a funnel or other receptacle located at the upper end of a conduit. Citrus workers normally try to pick the fruit as quickly as possible. This can result in some fruit being mishandled, accidentally dropped to the ground and damaged. In addition, most known harvesting machines deliver the fruit to a receptacle which must be periodically emptied. This can cause inefficient delays in the harvesting process.

Conventional citrus harvesters also tend to experience problems maneuvering within constricted groves, as well as between oddly or unevenly spaced rows of trees. It can be difficult, if not impossible, to laterally maneuver the machine in order to provide the workers with ready access to the trees on both sides of a row. Irrigation ditches and/or rough terrain can further complicate maneuverability of the machine and may interfere with the machine's ability to position the buckets and workers at a level position so that productive harvesting may be completed.

SUMMARY OF THE INVENTION

It is therefore the object of this invention to provide a harvesting machine that allows citrus and other fruits and produce to be harvested much more quickly, efficiently, and cost effectively than in the past.

It is the further object of this invention to provide a harvesting machine which largely eliminates the problems often associated with manual harvesting and conventional mechanical harvesters.

It is the further object of this invention to provide a harvester that significantly reduces the risk of worker injury and attendant worker's compensation costs.

It is the further object of this invention to provide a harvester that permits produce bearing trees to be more efficiently and fully harvested and which does not damage the produce or the trees during the harvesting process.

It is the further object of this invention to provide a harvester that allows multiple rows of produce bearing trees to be harvested simultaneously and at various heights using a single machine.

It is the further object of this invention to provide a harvester that permits large quantities of fruit or other produce to be quickly and efficiently without causing excessive damage to either the harvested items or the tree.

It is the further object of this invention to provide a harvesting machine that provides for many of the benefits of manual harvesting but which, at the same time, reduces significantly the labor costs and other problems associated with manual harvesting.

It is the further object of this invention to provide a harvester that is suitable for use with all types of tree grown fruits and produce and in all types and sizes of groves and orchards.

It is the further object of this invention to provide a harvesting machine that makes it easier for the worker to reliably deposit picked produce into a transferring conduit and which significantly reduces the risk that such produce will be accidentally dropped to the ground and damaged.

It is the further object of this invention to provide a harvesting machine which enables picked produce to be continuously collected by an auxiliary vehicle without interrupting the harvesting operation.

It is the further object of this invention to provide a harvesting machine which exhibits considerably improved maneuverability within various types of groves and which operates efficiently in constricted and uneven spaces and over uneven terrain.

It is the further object of this invention to provide a harvesting machine which supports workers at an improved level orientation so that fruit or other harvest may be effectively picked.

It is the further object of this invention to provide a harvesting machine that improves the harvesting efficiency and productivity significantly.

This invention features a machine for harvesting produce from a pair of adjacent, generally parallel rows of produce-bearing trees. The machine includes a land vehicle having a chassis for being driven between the adjacent rows of trees. The chassis supports a fruit collection receptacle. At least one pair of selectively extendable and retractable lift arms are pivotally mounted to the chassis. Each arm in each pair supports proximate a distal end thereof a carrier for holding a person. The arm is adjustable to position the carrier such that a person in the carrier is able to manually collect produce from a respective one of the rows of trees. There are a plurality of conduits, each of which is interconnected between the funnel-shaped bottom of a respective one of the carriers and the receptacle for transmitting produce deposited into the carrier by a person in the carrier and for discharging the transmitted produce into the receptacle.

In a preferred embodiment, the lift arms are mounted on respective opposite sides of the chassis such that each arm is positioned to correspond with a respective one of the adjacent rows of trees. A conveyor may be mounted to the chassis for transporting produce from the receptacle to a storage bin connected to the chassis. At least one chute may be attached to the chassis in communication with the receptacle for introducing produce collected from a location proximate ground level into the receptacle. Each arm may be telescopically extendible and retractable. The lift arms may include a first pair of upper level arms for positioning respective carriers and persons therein so that such persons are able to collect produce from upper levels of the adjacent rows of trees. A second pair of intermediate lift arms may be provided for positioning respective carriers and persons therein so that such persons are able to collect fruit or produce from intermediate levels of the adjacent rows of trees, which intermediate levels are below the upper levels of the trees. The carriers may include respective buckets mounted proximate of distal ends of the lift arms.

The conduit may include a flexible pipe. The carrier or bucket itself may comprise a funnel for facilitating introduction of collected fruit into the conduit.

The machine may utilize four wheel steering to improve maneuverability in a grove. The wheels may be pivotably adjustable so that when the machine travels over uneven terrain the carriers are maintained in a level condition. A hydraulic or pneumatic accumulator may be used to adjust the wheels upwardly or downwardly as required.

DETAILED DESCRIPTION OF PREFERRED EMBODIMENTS

Other objects, features and advantages will occur from the following description of a preferred embodiment and the accompanying drawings, in which:

FIG. 4 is a simplified elevational, cross sectional view of the receptacle and a conveyor which may be utilized in connection with the receptacle;

FIG. 6 is an elevational side view of a lift bucket employing a funnel-shaped bottom that communicates directly with the conduit;

FIG. 7 is a top plan view of the bucket of FIG. 6;

Figure 1:
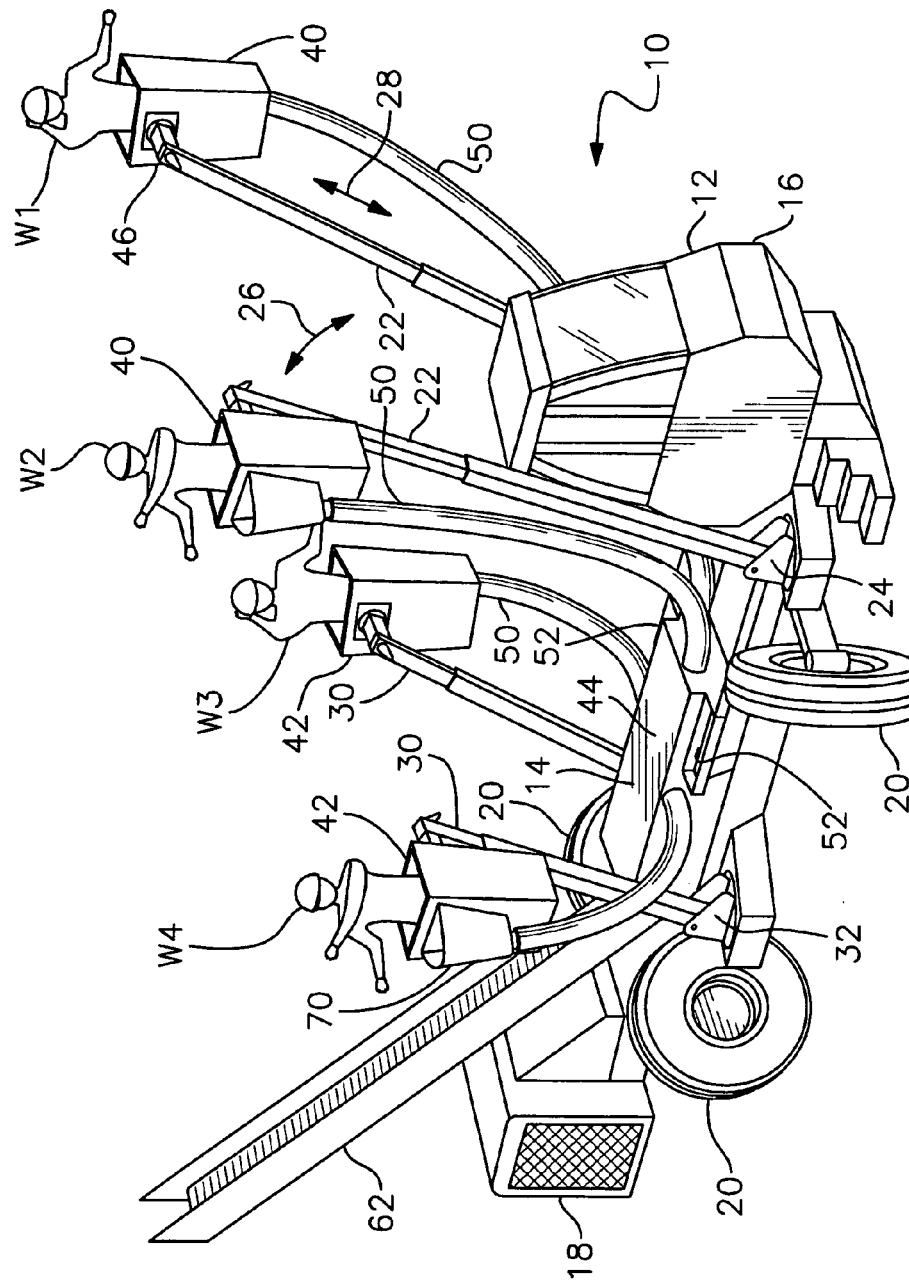
FIG. 1 is a perspective view of a preferred harvesting machine according to this invention.
Figure 2:
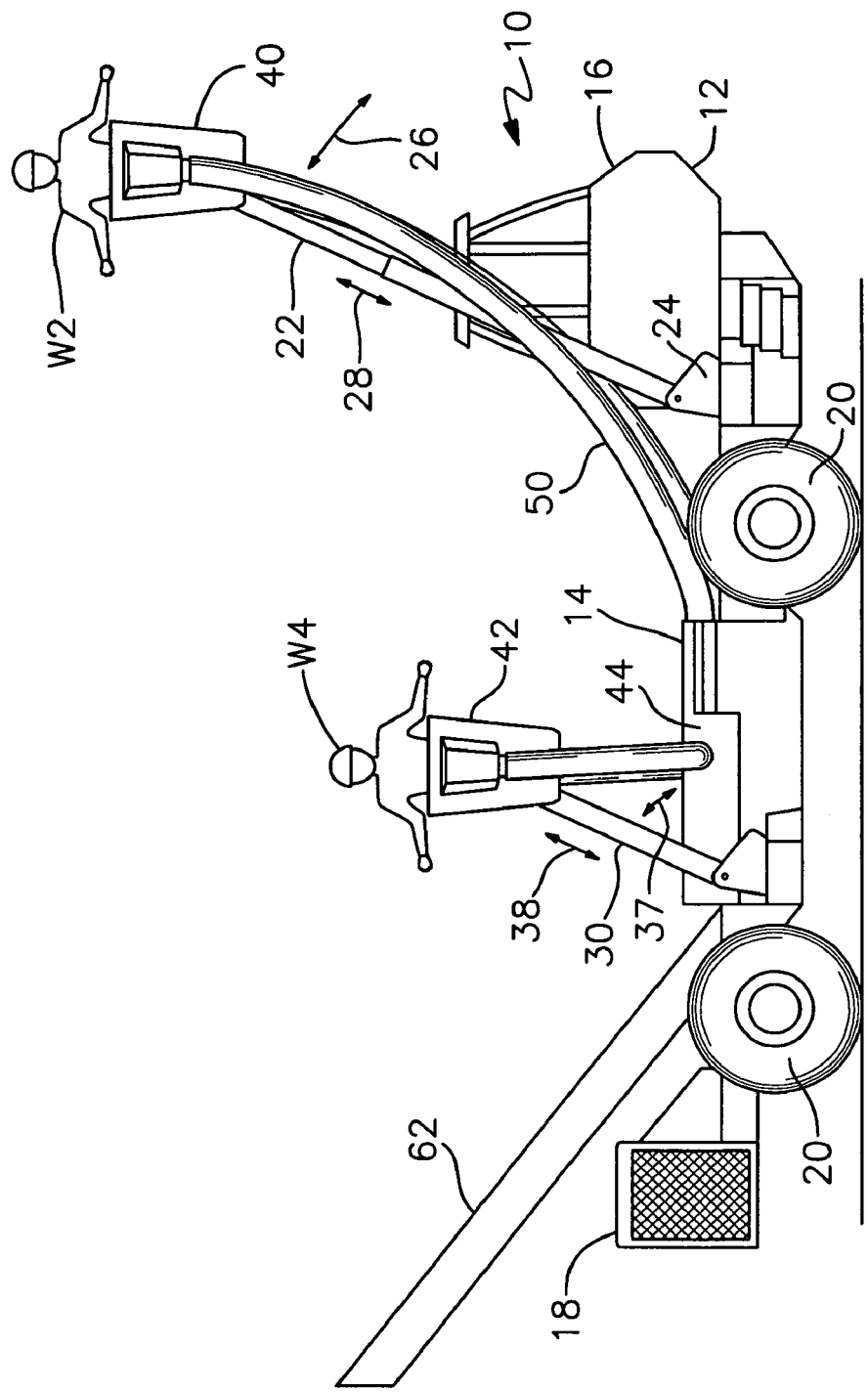
FIG. 2 is an elevational side view of the harvesting machine.
Figure 3:
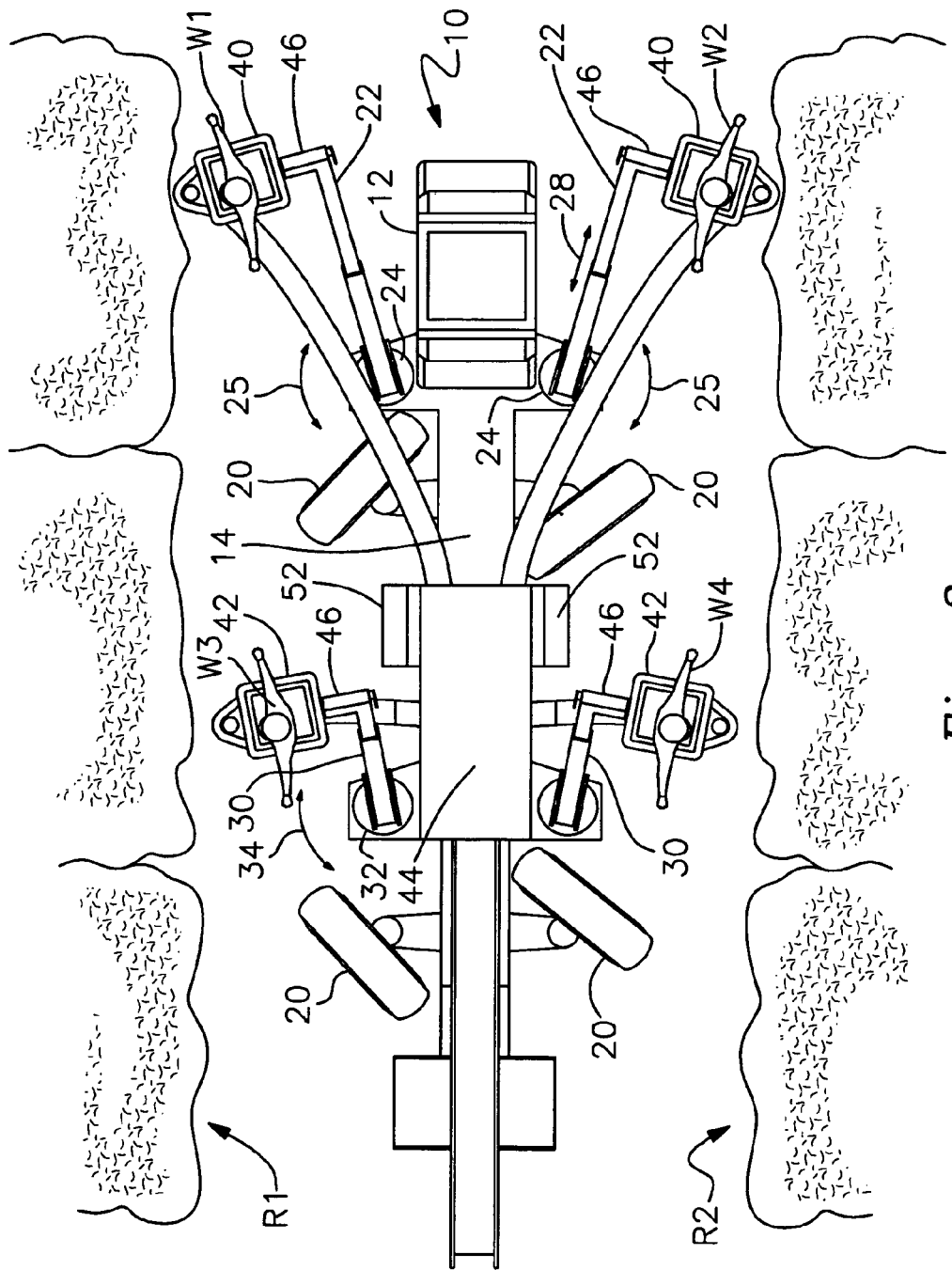
FIG. 3 is a top plan view of the harvester positioned between a pair of generally parallel adjacent rows of produce bearing trees; the lift arms are deployed to depict how the produce is manually harvested by workers in the respective lift buckets.

There is shown in FIGS. 1-3 a harvesting machine 10 that is particularly suited for use in citrus harvesting. It should be understood, however, that machine 10 is suitable for use in harvesting all types of fruits or other types of tree grown produce. The particular type of produce harvested is not a limitation of this invention. As used herein "produce" is intended to include all varieties of tree grown fruits, nuts, vegetables and any other items which need to be periodically harvested. Machine 10 is particularly beneficial for use in groves or orchards having generally parallel rows of fruit bearing trees. The unique construction of the machine permits a pair of adjacent rows to be quickly, efficiently and simultaneously harvested.

Machine 10 comprises a land vehicle 12 that is adapted to be driven between adjacent rows of fruit or produce bearing trees in a grove or orchard. See rows R1 and R3 in FIG. 3. Land vehicle 12 includes a chassis 14 that supports a cab 16 at its forward end and a power unit 18 at its rearward end. Chassis 14 is itself mounted on a plurality of wheels 20. As is best shown in FIG. 3, all of the wheels are steerable and the forward wheels 20 are steerable independently from, and opposite to the rearward wheels. This permits machine 10 to be highly maneuverable so that the machine can be conveniently positioned within the grove to achieve optimal harvesting. Conventional four-wheel steering systems may be utilized.

It should be understood that various types of land vehicles may be used for machine 10. These may include vehicles wherein the cab and engine are integral with the chassis or body of the vehicle as shown in the drawings. Alternatively, the wheel mounted body or chassis may comprise an independent vehicle that is releasably connected to and pulled by a tractor, truck or other motorized vehicle. Land vehicle 12 may comprise anyone of a variety of motorized vehicles suited for use in agricultural or industries. The particular type of land vehicle utilized and the particular engine employed to drive the vehicle are not limitations of the invention. An assortment of alternative vehicle constructions, which will be understood by persons skilled in the art, may be utilized.

A forward pair of upper level booms or lift arms 22 are mounted in articulated fashion to a forward end of chassis 14 adjacent to cab 16. The lift arms are positioned on opposite sides of chassis 14. Each of the forward lift arms 22 comprises a plurality of telescopically interengaged components. The lower end of each lift arm 22 is mounted by means of an articulating component 24 to chassis 14. The articulating components 24 are themselves rotatably mounted to chassis 14 such that the forward lift arms are allowed to swivel or turn, relative to the chassis as indicated by double headed arrow 25 in FIG. 3. Each lift arm 22 is pivotable upwardly by and downwardly within its respective articulating component as indicated by double headed arrow 26 in FIGS. 1 and 2. Each lift arm is also selectively extendable and retractable in a telescoping manner as indicated by double headed arrow 28. Each lift arm is operated by appropriate controls in a manner that is described more fully below.

An analogous pair of intermediate level rear lift arms 30 are mounted in a similar fashion to chassis 14 rearwardly of forward lift arms 22. The rearward lift arms are constructed and operate analogously to the forward lift arms. In particular, each rearward lift arm is mounted to the chassis in an articulating fashion by a respective articulating component 32. As with the forward articulating components, each articulating component 32 is itself mounted to chassis 14 such that it swivels or rotates relative to the chassis as indicated by double-headed arrow 34 in FIG. 3. Each rearward lift arm 30 is pivotable up and down within its respective articulating component 32, as shown by double-headed arrow 37, and is selectively extendible and retractable as indicated by double-headed arrow 38. As is clearly indicated in FIGS. 1 and 3, each of the forward lift arms 22 is mounted on a respective side of chassis 14. Similarly, each of the rearward lift arms 30 is mounted on a respective opposite side of the chassis. This permits the booms of lift arms to be utilized simultaneously with adjacent rows of trees in a grove or orchard. The lift arms and associated articulating components are constructed of durable metal or metal alloy materials of the type used in agricultural and industrial "cherry picker" machinery. Appropriate pivots, bearings, fittings, sleeves and other components may be assembled in a conventional manner to construct the lift arms and articulating components.

A carrier 40 is connected proximate the upper distal end of each of the forward lift arms 22. A similar carrier 42 is likewise mounted proximate the distal or upper end of each rearward lift arm 30. More particularly, each carrier comprises a bucket, platform or other, preferably enclosed structure for supporting a respective worker W1-W4. Each carrier 40, 42, is pivotally or hingedly secured to the upper end of its respective lift arm by a hinge or pivot bearing 46. Various known types of bearings may be utilized. Once again, the buckets 40, 42 are preferably composed of a durable metal or metal alloy of type commonly utilized in "cherry picker" machines. Fiberglass may also be used. The forward lift arms 22 are typically longer, in their fully extended condition, than rearward lift arms 30. This allows the forward lift arms to be raised to an elevation so that workers W1 and W2 can service the upper levels of the trees in adjacent rows of the grove. Shorter rearward lift arms 32 are selectively extended to position respective workers W3 and W4 at somewhat lower, intermediate levels or heights within the adjacent rows trees. This permits all levels of the tree to be efficiently harvested in the manner described more fully below. It should be noted that, in alternative embodiments, the short lift arms may be positioned forwardly of the longer lift arms.

A fruit or produce receiving receptacle or reservoir 44 is mounted to or built within the chassis 14. In certain versions, receptacle 44 simply comprises a chamber, hopper or container having various sizes. In other versions, such as shown in FIG. 4, receptacle 44 may house a conveyor 47. The operation of this conveyor is described more fully below. Receptacle 44 includes a plurality of entry ports 48, FIG. 4, that are communicably engaged with the lower end of respective produce-transmitting conduits 50. Ground level chutes 52, FIGS. 1-4, are also formed in respective sides of receptacle 44. Conveyor 47 is operated by a known type of conveyor drive mechanism (not shown). As best shown in FIG. 4, receptacle 44 includes an opening 60 at its rearward end. The rearward end of conveyor 47 terminates proximate opening 60 and is operably connected to an elevating conveyor 62. This apparatus is likewise driven by a known type of conveyor drive mechanism. In alternative embodiments of this invention, the elevating conveyor, as well as receptacle conveyor 47 may be eliminated and the receptacle may comprise a large bin or hopper into which fruit or other produce is delivered in the manner described below.

As shown in FIGS. 1-3, each fruit transmitting conduit 50 is interconnected between a respective carrier bucket 40, 42 and receptacle 44. More particularly, each conduit comprises a flexible tube, pipe or hose that is joined at its lower end to a respective inlet port 48 formed in receptacle 44. The opposite, upper end of each conduit is connected to a respective one of the carrier buckets. More particularly, a funnel 70 is attached to the outer wall of each bucket such that the entrance of the funnel is positioned proximate or slightly below the lip of the bucket. This positioning should allow the worker in the bucket to conveniently deposit fruit into the funnel. The lower end of the funnel is communicably secured in any acceptable manner to the upper end of a respective conduit pipe 50. Each conduit pipe may be formed of any reasonably light-weight, yet strong and preferably flexible material such as plastic or rubber. Duct work type piping and PVC pipes may be utilized. The lower end of funnel 70 is received by the upper end of pipe 50 so that the funnel communicates with the pipe. The pipes should be constructed so that they move easily and without kinking as the respective lift arms and buckets are manipulated during the harvesting process. As described more fully below, when picked fruit is deposited into the funnel, gravity typically causes the fruit to be transmitted through the conduit and to the receptacle. In certain embodiments, a vacuum-assist mechanism may be used to help propel the picked fruit through the conduit toward the receptacle.

Known types of controls and automated drive mechanisms may be utilized for operating the lift arms and attached buckets. For example, the lift arms may be pivoted, rotated and selectively extended and retracted by suitable hydraulic, electric, pneumatic and/or other known drive mechanisms of the type commonly used in the "cherry picker" industry. The controls may be located inside cab 16 and operated by a driver of vehicle 12. Alternatively, each individual lift arm and associated bucket may be controlled by the worker within the bucket by means of controls located in the bucket. These controls may be actuated by the operator's knees so that the individual worker can control positioning of his bucket while his hands remain free to pick fruit or other produce from the trees. The controls may be microprocessor driven and may be programmed to provide a pre-determined lift sequence and/or timing for each lift arm and associated bucket. In many cases, however, it will be preferred for each worker to be able to individually position his or her own bucket as needed to accomplish optimal harvesting. The various types of controls that may be utilized should be known to persons skilled in the lift and "cherry picker" industries and do not constitute a feature or limitation of this invention.

In operation, land vehicle 12 is driven and maneuvered between an adjacent, generally parallel row of trees, which are best depicted as rows R1 and R2 in FIG. 3. Independently steerable wheels 20 are turned as needed to maneuver machine 10 into the position suited for the particular location being harvested. The lift arms and respective buckets are then driven by the controls to position workers W1, W2, W3 and W4 as desired, relative to rows R1 and R2 of produce-bearing trees. More particularly, the forward arm 22 and rearward arm 30 on the left hand side of the machine position workers W1 and W3 relative to the trees in row R1. The forward arm 22 and attached bucket 40 define an upper level picking station, which is driven by the appropriate controls to a height proximate the upper levels of the trees. This enables worker W1 to quickly and efficiently harvest fruit or other produce from such upper levels. As each item is picked, it is deposited by the worker into the funnel 70 associated with that bucket. The fruit or other produce then drops through the attached conduit 50 (by gravity and/or a vacuum-assist) and is discharged into receptacle 44 through inlet port 48. Similarly, the rearward, left hand lift arm 30 is operated to position worker W3 at an intermediate level, somewhat below worker W1. Produce is collected and transmitted to receptacle 44 in an analogous fashion. The operations of the forward and rearward lift arms are coordinated so that the respective lift arms, buckets and workers do not interfere with one another. Workers W1 and W3 may be able to control their own respective movements. Alternatively the movement of the buckets may be controlled within the cab or automatically as previously described. As a result, the forward and rearward lift buckets are moved in a pre-determined or desired pattern about the tree. Fruit is harvested quickly and efficiently. Because the fruit is deposited into and transmitted through the flexible conduits, it is not dropped onto the ground and bruised or damaged. Moreover, dropped fruit does not have to be collected by other workers from the ground. Because the fruit or produce is not stored within each bucket, the lift arm does not have to be repeatedly raised and lowered to empty a full bin or container. Improved, faster, more efficient and more complete manual harvesting is achieved.

The forward and rearward lift arms and attached buckets located on the right-hand side of machine 10 operate in a analogous manner. As a result, the trees in row R2 are harvested quickly and efficiently in a manner similar to row R1. Each item of fruit picked by worker W2, W4 is deposited into its associated funnel and transmitted by its associated conduit 50 into receptacle 44. Once again, the worker does not have to drop the fruit onto the ground or deposit it into a bin within the bucket which must be regularly emptied. The above described benefits are thereby provided in connection with row R2.

Chutes 52 are located directly on receptacle 44 and are relatively close to the ground. Workers located at a lowermost or ground level are thereby able to pick fruit or produce from the trees in rows R1 and R2 at ground level and deposit those items directly into the receptacle throughout chutes 52 located on either side of the receptacle. Through the use of the opposing upper level forward buckets 40, intermediate level rearward lift arms 30 and ground level chutes 52, three height levels of harvesting may be performed simultaneously. Workers W1 and W2 in forward buckets harvest the upper levels of the trees; workers W3 and W4 in rearward buckets 40 harvest the intermediate levels of the trees; and workers located on the ground level harvest the trees and deposit the picked fruit through chutes 52 directly into receptacle 44.

As best shown in FIG. 4, after fruit F is discharged or deposited into receptacle 44, it collects on conveyor 47 and is transmitted in the direction of arrow 80 outwardly through rear opening 60 of receptacle 44. The fruit is then passed onto elevating conveyor 62. This conveyor transmits the fruit to a standard GOAT apparatus that may be attached to or follow machine 10. After the GOAT is filled, it may be replaced by an empty GOAT. Uninterrupted harvesting is thereby achieved.

Machine 10 provides for a number of significant advantages in the fruit harvesting and agricultural industries. Because the workers are quickly and easily positioned and maneuvered about the trees, less workers are required for harvesting. Labor costs and worker problems are reduced considerably. At the same time, the fruit or produce is manually harvested so that the problems associated with fully automated equipment are avoided. In particular, a more complete harvesting is accomplished and less fruit is missed and wasted. Moreover, there is little, if any damage caused to the fruit by the machinery. The use of the conveniently operated lift arms and attached buckets also enables fruit and other produce to be picked conveniently and much more safely than has heretofore been possible. Ladders commonly used in fruit harvesting and the risk of falls and resulting injuries are eliminated. As previously described, the grove or orchard may be covered quickly, completely and efficiently in a pre-determined and virtually automated manner. Unlike any other harvesting machine, the apparatus of this invention enables a pair of adjacent rows in a grove or orchard to be harvested simultaneously. Harvesting efficiency and productivity are thereby improved significantly. Individual items are picked manually but are otherwise transmitted and collected by the machine without requiring additional workers to pick up and transfer the produce. The harvesting process is automated significantly so that labor costs are reduced; however, the benefits resulting from manual harvesting are maintained at the same time.

Figure 5:
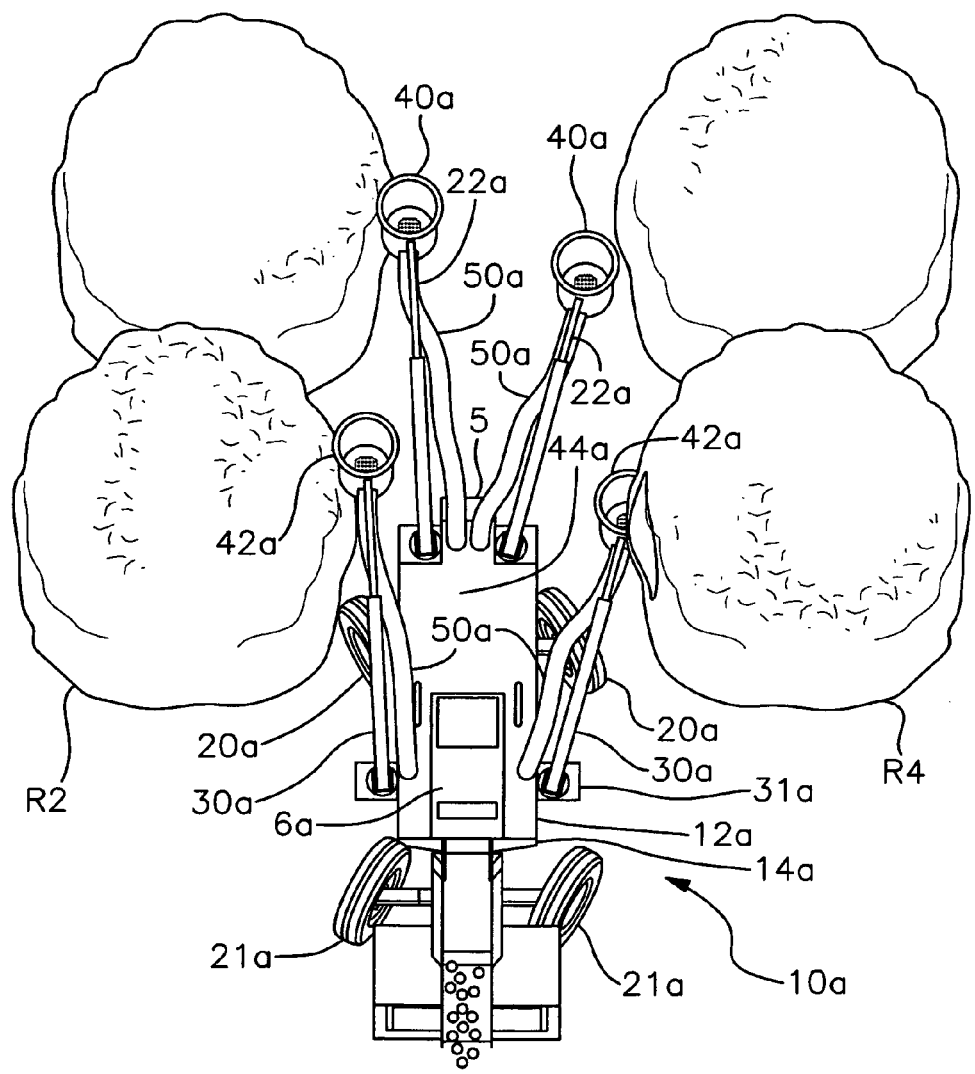
FIG. 5 is a plan view of an alternative preferred harvesting machine according to this invention positioned between parallel rows of trees in a grove.

FIG. 5 shows an alternative preferred harvesting machine 10a according to this invention. Once again, machine 10a comprises a land vehicle 12a that is intended to be driven between rows of fruit or produce producing trees R2 and R4. Independently steerable front wheels 20a and rear wheels 21a support chassis 14a and enable the machine to be conveniently maneuverable between rows R2 and R4 of the grove. Various types of land vehicles may be employed as in the previously described embodiment.

Forward and rearward pairs of lift arms 22a and 30a are mounted rotatably upon respective pedestals 31a. More particularly, each pedestal may carry a respective articulating element analogous to that shown in the previously described embodiment. The articulating element supports a respective telescoping lift arm and enables the lift arm to pivot or rotate about a vertical axis. Once again, the construction and operation of the lift arms may be identical or similar to that described in the prior embodiment.

A respective carrier, normally comprising a lift bucket, is supported at the upper end of each lift arm. More particularly, the forward lift arms 22a support buckets 40a and the rearward lift arms 30a hold respective buckets 42a. Each bucket or other form of carrier is designed to support a single worker in the manner described in the preceding embodiment.

A preferred carrier or bucket 40a, which is representative of each of the carriers in this embodiment, is depicted in FIGS. 6 and 7. The bucket has a generally cylindrical shape that is large enough for accommodating a single worker therein. Each bucket is pivotally mounted to a respective lift arm by a flange or bracket 41a that is secured to the lift arm (not shown in FIGS. 6 and 7) by an appropriate pin or pivot. The carrier bucket of this version may be constructed of materials that are analogous of those described for the embodiment of FIGS. 1-4.

A particularly significant feature of this version is the use by the carrier or bucket of a funnel-shape bottom portion 43a that is formed at the lower end of carrier 40a. More particularly, the carrier includes a floor 45a that is sloped downwardly toward a discharge opening comprising a spout 47a. The spout communicates with the interior 49a of carrier 40a and is itself communicably connected with the entrance at the upper end of a respective conduit 50a (omitted in FIGS. 6 and 7, but see FIG. 5). The conduit again comprises a length of flexible tubing. This tubing is connected to spout 47a of carrier 40a such that the conduit communicates with the interior space 49a of carrier 40a.

A floor plate or platform 51a is attached to an interior wall 53a of carrier 40a. Platform 51a extends generally horizontally across space 49a. A generally annular gap 55a, FIG. 7, surrounds most of platform 51a and it disposed between the inside wall 53a and the circumference of the platform (other than that part of the platform's circumference attached to the inner wall of the carrier). This gap is wide enough so that fruit or other produce fits through the gap.

Machine 10a is operated in a manner analogous to the previously described embodiment. The machine travels between rows R2 and R4, FIG. 5, and the lift arms are operated pivotally and longitudinally to position workers at selected heights and positions relative to the trees so that convenient and productive harvesting may be accomplished. Controls may be provided in each carrier to allow the worker to independently adjust their position. Alternatively, the carriers may be repositioned through controls located within cab 69. Four workers pick fruit or other produce independent of one another. In this version, the worker deposits the fruit into the conduit attached to his or her bucket by simply dropping or otherwise depositing the produce directly into the bucket, as shown in FIGS. 6 and 7. As each piece of produce or fruit F is dropped, it falls through gap 49a between platform 51a and inner wall 53a. The fruit or other produce then rolls down the sloped floor 43a through spout 47a and into the attached and communicating conduit 50a. The picked produce then proceeds through the conduit and is transmitted by gravity feed exclusively to a storage bin or receptacle 44a within the chassis of the vehicle. An operator is typically located in the cab of land vehicle 12a to drive the vehicle through the grove between rows R2 and R4. In this version, a front-mounted spout 5 is provided into bin 44a which allows workers on the ground to harvest low growing fruit and to transfer such fruit from picking sacks to the spout and into the storage bin.

The use of the carrier depicted in FIGS. 5-7, wherein the carrier is communicably connected to a respective conduit, is particularly advantageous in avoiding dropped, damaged and wasted produce. During normal harvesting, the worker typically picks produce and deposits such produce into a conduit or other receptacle quite rapidly. As a result, the worker is apt to mishandle and accidentally drop some of the picked produce. Fruit or other produce that falls from a lift bucket to the ground is apt to be damaged. The carrier configuration depicted in FIGS. 6 and 7 largely avoids this problem. The worker does not have to place the picked produce into a separate receptacle, conduit or funnel positioned outside of the bucket. Instead, he or she simply drops or otherwise deposits the picked produce directly into the carrier itself. After the produce is dropped, it rolls down the sloped floor 43a and is deposited automatically and reliably into the conduit. The picking operation becomes virtually foolproof and accident free. Much less fruit is mishandled and accidentally dropped to the ground; productivity levels are increased accordingly.

Figure 8:
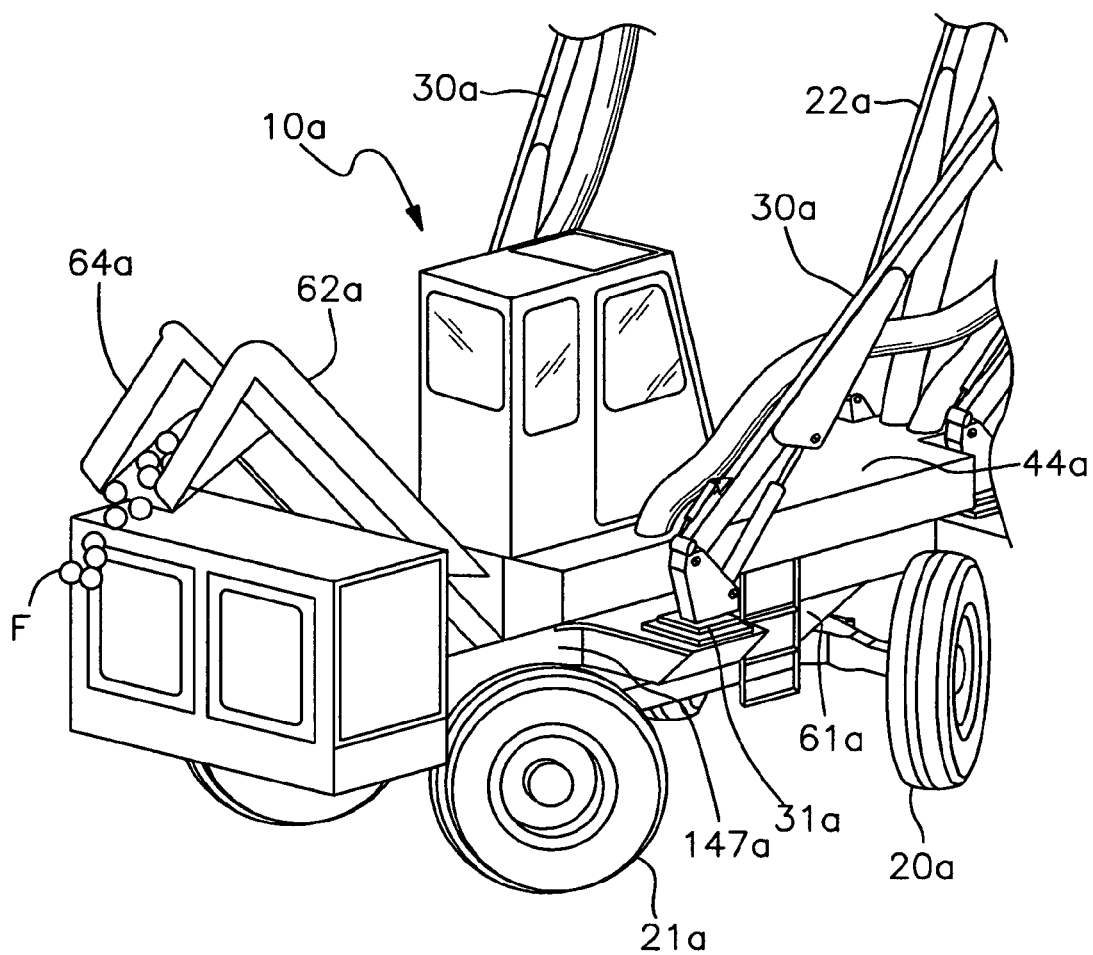
FIG. 8 is a perspective view of the chassis, wheels, lower ends of the lift arms and receptacle utilized in the embodiment of FIG. 5.
Figure 9:
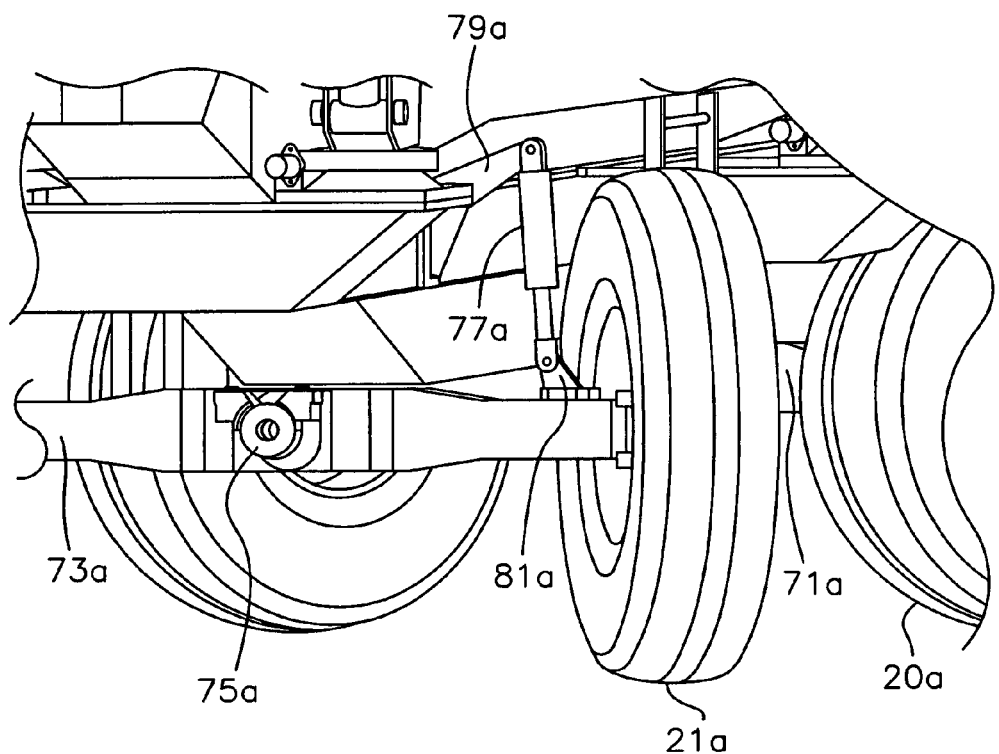
FIG. 9 is a perspective view of the wheel leveling system that may be used in this invention.

FIG. 8 depicts a perspective view of machine 10a. As in FIG. 5, rear wheels 21a and forward wheels 20a are positioned in a "round steer" mode. This allows the machine to be precisely maneuvered and turned, even within uneven, tight or constricted spacing between the rows of a grove. The independent four-wheel steering also allows the machine to turn precisely at the ends of rows and to effectively negotiate obstacles such as drainage ditches. Alternatively, wheels 20a and 21a may be manipulated to assume a "crab mode", wherein the front and rear wheels are turned and maintained in the same direction such that the wheels are parallel to one another but are oriented at an angle to the longitudinal axis of the machine. This allows the machine to be maneuvered laterally within the grove. As a result, the machine and the lift arms as well as the carriers can be positioned conveniently relative to (i.e. moved toward or away from, as needed) the respective rows of trees so that more productive harvesting is accomplished. Of course, when required, the front wheels may be aligned with one another such that they are parallel to the longitudinal axis of the machine. This allows the machine to drive forwardly between the rows of the grove.

FIG. 8 further illustrates the use of tapered sides 61a, at least near the bottom of storage bin 44a. This directs the deposited produce to horizontal conveyor 47a. This conveyor in turn transfers the picked produce to an elevator 62a having a chute 64a formed at the upper end thereof. The fruit F is delivered from the conveyor 47a and elevator 62a through chute 64a to a field transport machine (not shown) that backs up against machine 10a during the harvesting operation. This allows fruit to be effectively transferred to a GOAT or other transport machine without interrupting the harvesting activity.

Positioning controls may be provided in the cab so that the driver or operator of the machine may position the lift arms and carriers as required. Either manual or automatic control over the carrier pattern may be utilized in order to optimize the harvesting process in accordance with grove conditions. Automatic control of the lift arms and carriers may be accomplished using control equipment that will be known persons skilled in the art.

Each pair of wheels 20a, 21a is mounted on a respective front and rear axle, 71a, 73a. Each axle is pivoted with respect to the chassis about a trunnion 75a. A stabilizer control mechanism comprising a hydraulic or pneumatic cylinder or accumulator 77a is interconnected between a bracket 79a mounted to the frame and a second bracket 81a mounted to the axle. Appropriate electronic controls may be utilized to automatically control cylinders 77a so that the axle adjusts to compensate for uneven terrain and maintain the harvesting machine in a level condition. It is important that the workers in the carriers be supported in a level position against the trees so that optimal harvesting may be accomplished. As the harvesting machine travel over uneven terrain, the wheels and axles tend to pivot up and down about trunnion 75a. Stabilizer control mechanisms 77a react to such movement and adjust the frame and thereby the machine to maintain the carriers on a level plane regardless of the topography of the terrain.

It should be understood that various alternative features may be employed within the scope of this invention. While the upper end of each conduit is described as connected to a respective carrier bucket, this means that the upper end of the conduit is attached to the bucket either communicably as described in the second version, externally, as set forth in the first version or indirectly, such as to the upper end of the associated lift arm or the structure interconnecting the lift arm and the bucket. In either case, it is important that the upper end of the conduit be as conveniently accessible to the worker within the bucket as possible so that picked fruit or produce may be deposited into the conduit, through a funnel or otherwise, and thereby transmitted to the receptacle conveniently and with minimal damage. For that reason, employing the bucket itself as a funnel for the conduit is particularly preferred. This version best avoids the problem of accidentally dropping produce from the bucket.

From the foregoing it may be seen that the apparatus of this invention provides for a system for harvesting tree grown fruit and produce. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims:

What is claimed is:

1. A machine for harvesting produce from a pair of adjacent, generally parallel rows of produce-bearing trees, said machine comprising:
   a land vehicle that includes a chassis for being driven between the adjacent rows of trees, said chassis supporting a produce collection receptacle;
   a first pair of independently operable, selectively extendible and retractable upper level lift arms pivotally mounted to said chassis on respective opposite sides thereof such that each upper level lift arm is positioned to correspond with a respective one of the adjacent rows of trees;
   a second pair of independently operable, selectively extendible and retractable intermediate level lift arms pivotally mounted to said chassis on respective opposite sides thereof such that each intermediate level lift arm is positioned to correspond with a respective one of the adjacent rows of trees;
   each said arm in each said pair supporting proximate a distal end thereof a carrier for holding a person, and said arm being adjustable to position said carrier such that a person in the carrier is able to manually collect produce from one of the rows of trees, said upper level lift arms for positioning their associated carriers and persons therein so that such persons are able to collect produce from the upper levels of the adjacent rows of trees and said intermediate level lift arms for positioning their associated carriers and persons therein so that such persons are able to collect produce from intermediate levels of the adjacent rows of trees, which intermediate levels are below the upper levels; and
   a plurality of conduits, each conduit attached proximate an upper end thereof to a respective one of said carriers in communication with an interior of said carrier such that an entrance of said conduit is accessible inside said carrier to a person in said respective carrier and each conduit further being attached proximate a lower end thereof to said receptacle, each conduit for transmitting produce deposited into said entrance through said conduit and discharging said transmitted produce into said receptacle; each said carrier including an enclosed bucket for accommodating and enclosing a respective person therein, said bucket including a bottom having a funnel-shaped floor that slopes downwardly to a discharge outlet communicably joined with an associated conduit, a side wall connected to and extending upwardly from said bottom to define an interior space within said bucket and a platform attached to an inside of said side wall and extending horizontally inwardly therefrom across said interior space of said bucket and above said bottom for supporting a person thereon such that said person is surrounded and enclosed by said side wall, said bucket further including a gap between and contiguous with a peripheral edge of said platform and said inside of said side wall such that said gap is disposed below a person supported on said platform, said gap surrounding most of said platform and being wide enough to transmit picked produce dropped within the bucket by the person supported on the platform to said bottom of said bucket such that said funnel-shaped floor directs the transmitted produce through said discharge outlet and into an associated said conduit wherein the produce is transmitted to said receptacle.

2. The machine of claim 1 in which each arm is telescopically extendible and retractable.

3. The machine of claim 1 further making at least one chute attached to said chassis and communicating with said receptacle for introducing produce collected from proximate ground level into said receptacle.

4. The machine of claim 3 in which said chute is accessible by a person standing on the ground such that such person is able to collect produce from ground levels of the adjacent rows of trees, which ground levels are below the intermediate levels.

5. The machine of claim 1 in which each said conduit includes a flexible pipe.

6. The machine of claim 1 in which said land vehicle includes a first pair of steerable front wheels and a second pair of independently steerable rear wheels for enabling said chassis to be driven selectively in a longitudinal direction between the adjacent rows of trees and in a lateral direction toward one of the rows of trees and away from the other row.

7. The machine of claim 1 in which said land vehicle includes a plurality of wheels upon which said land vehicle travels over underlying terrain, each said wheel pivotally attached to said chassis such that said wheel may be pivotally raised and lowered relative to said chassis to adjust for variations in the underlying terrain and to maintain said carrier in a level condition as said land vehicle is moved over the terrain.

8. The machine of claim 7 in which each said wheel is carried at the end of an axle that is pivotally connected to said chassis and further including a stabilizer control device for pivotally adjusting said axle such that said carrier remains level as said wheel travels over uneven terrain.

9. The machine of claim 1 in which said receptacle includes side walls that slope inwardly from top to bottom to direct produce to a conveyor.

10. The machine of claim 1 in which the produce is transmitted through the conduit by gravity feed exclusively.

11. The machine of claim 1 in which said funnel-shaped floor is disposed directly beneath said platform.

12. The machine of claim 11 in which said platform and said gap surrounding said platform are uninterrupted by an intervening vertical wall.

13. The machine of claim 1 in which said side wall of said bucket is a single side wall for surrounding a worker disposed in said interior space, which single side wall is joined to said funnel-shaped floor for enabling picked produce dropped directly into said interior space of said bucket to be transmitted through said gap to said funnel-shaped floor without having to be placed into a separate receptacle, conduit or funnel exteriorly of said single side wall, said interior space being devoid of a vertical wall.

14. The machine of claim 13 in which said single side wall of said bucket includes a cylindrical shape and said gap has a generally annular shape surrounding most of said platform.

15. The machine of claim 1 in which said gap extends sufficiently about the peripheral edge of said platform such that produce dropped anywhere within said bucket is transmitted through said gap and automatically directed by said funnel-shaped floor through said discharge outlet and into said associated conduit.

16. The machine of claim 1 in which said gap is disposed vertically adjacent said platform and at the same height as said platform within said bucket.

17. A machine for harvesting produce from a pair of adjacent, generally parallel rows of produce-bearing trees, said machine comprising:
   a land vehicle that includes a chassis for being driven between the adjacent rows of trees, said chassis supporting a produce collection receptacle;
   a first pair of independently operable, selectively extendible and retractable upper level lift arms pivotally mounted to said chassis on respective opposite sides thereof such that each upper level lift arm is positioned to correspond with a respective one of the adjacent rows of trees;
   a second pair of independently operable, selectively extendible and retractable intermediate level lift arms pivotally mounted to said chassis on respective opposite sides thereof such that each intermediate level lift arm is positioned to correspond with a respective one of the adjacent rows of trees;
   each said arm in each said pair supporting proximate a distal end thereof a carrier for holding a person, and said arm being adjustable to position said carrier such that a person in the carrier is able to manually collect produce from one of the rows of trees, said upper level lift arms for positioning their associated carriers and persons therein so that such persons are able to collect produce from the upper levels of the adjacent rows of trees and said intermediate level lift arms for positioning their associated carriers and persons therein so that such persons are able to collect produce from intermediate levels of the adjacent rows of trees, which intermediate levels are below the upper levels;
   a plurality of conduits, each conduit attached proximate an upper end thereof to a respective one of said carriers in communication with an interior of said carrier such that an entrance of said conduit is accessible inside said carrier to a person in said respective carrier and each conduit further being attached proximate a lower end thereof to said receptacle, each conduit for transmitting produce deposited into said entrance through said conduit and discharging said transmitted produce into said receptacle; each said carrier including an enclosed bucket for accommodating and enclosing a respective person therein, said bucket including a bottom having a funnel-shaped floor that slopes downwardly to a discharge outlet communicably joined with an associated conduit, a side wall connected to and extending upwardly from said bottom to define an interior space within said bucket and a platform attached to an inside of said side wall and extending horizontally inwardly therefrom across said interior space of said bucket and above said bottom for supporting a person thereon such that said person is surrounded and enclosed by said side wall, said bucket further including a gap between and contiguous with a peripheral edge of said platform and said inside of said side wall such that said gap is disposed below a person supported on said platform, said gap surrounding most of said platform and being wide enough to transmit picked produce dropped within the bucket by the person supported on the platform to said bottom of said bucket such that said funnel-shaped floor directs the transmitted produce through said discharge outlet and into an associated said conduit wherein the produce is transmitted to said receptacle; and
   a conveyor located within said receptacle and mounted below said lower ends of said conduits such that produce transmitted through said conduits is deposited directly on said conveyor, which said conveyor transmits such produce from said receptacle to a storage bin connected to said chassis.

18. A machine for harvesting produce from a pair of adjacent, generally parallel rows of produce-bearing trees, said machine comprising:
   a land vehicle that includes a chassis for being driven between the adjacent rows of trees, said chassis supporting a produce collection receptacle;
   a first pair of independently operable, selectively extendible and retractable upper level lift arms pivotally mounted to said chassis on respective opposite sides thereof such that each upper level lift arm is positioned to correspond with a respective one of the adjacent rows of trees;
   a second pair of independently operable, selectively extendible and retractable intermediate level lift arms pivotally mounted to said chassis on respective opposite sides thereof such that each intermediate level lift arm is positioned to correspond with a respective one of the adjacent rows of trees;
   each said arm in each said pair supporting proximate a distal end thereof a carrier for holding a person, and said arm being adjustable to position said carrier such that a person in the carrier is able to manually collect produce from one of the rows of trees, said upper level lift arms for positioning their associated carriers and persons therein so that such persons are able to collect produce from the upper levels of the adjacent rows of trees and said intermediate level lift arms for positioning their associated carriers and persons therein so that such persons are able to collect produce from intermediate levels of the adjacent rows of trees, which intermediate levels are below the upper levels;
   a plurality of conduits, each conduit attached proximate an upper end thereof to a respective one of said carriers such that an entrance of said conduit is accessible to a person in said respective carrier and each conduit further being attached proximate a lower end thereof to said receptacle, each conduit for transmitting produce deposited into said entrance through said conduit and discharging said transmitted produce into said receptacle; each said carrier including an enclosed bucket for accommodating and enclosing a respective person therein, said bucket including a bottom having a funnel-shaped floor that slopes downwardly to a discharge outlet communicably joined with an associated conduit, a side wall connected to and extending upwardly from said bottom to define an interior space within said bucket and a platform attached to an inside of said side wall and extending horizontally inwardly therefrom across said interior space of said bucket and above said bottom for supporting a person thereon such that said person is surrounded and enclosed by said side wall, said bucket further including a gap between and contiguous with a peripheral edge of said platform and said inside of said side wall such that said gap is disposed below a person supported on said platform, said gap surrounding most of said platform and being wide enough to transmit picked produce dropped within the bucket by the person supported on the platform to said bottom of said bucket such that said funnel-shaped floor directs the transmitted produce through said discharge outlet and into an associated said conduit wherein the produce is transmitted to said receptacle; and a first pair of steerable front wheels and a second pair of independently steerable rear wheels for enabling said chassis to be driven selectively in a longitudinal direction between the adjacent rows of trees and in a lateral direction toward one of the rows of trees and away from the other row.

19. The machine of claim 18 in which said land vehicle travels over underlying terrain each said wheel pivotally attached to said chassis such that said wheel may be pivotally raised and lowered relative to said chassis to adjust for variations in the underlying terrain and to maintain said carrier in a level condition as said land vehicle is moved over the terrain.

20. The machine of claim 18 in which each said wheel is carried at the end of an axle that is pivotally connected to said chassis and further including a stabilizer control device for pivotally adjusting said axle such that said carrier remains level as said wheel travels over uneven terrain.

* * * * *